US010119045B2

(12) United States Patent
Kondo et al.

(10) Patent No.: US 10,119,045 B2
(45) Date of Patent: Nov. 6, 2018

(54) ELECTROCONDUCTIVE SILVER PASTE

(71) Applicant: TOYOBO CO., LTD., Osaka (JP)

(72) Inventors: Takashi Kondo, Shiga (JP); Hiromichi Yonekura, Shiga (JP); Satoshi Imahashi, Shiga (JP); Maki Kinami, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/542,689

(22) PCT Filed: Jan. 13, 2016

(86) PCT No.: PCT/JP2016/050765
§ 371 (c)(1),
(2) Date: Jul. 11, 2017

(87) PCT Pub. No.: WO2016/114279
PCT Pub. Date: Jul. 21, 2016

(65) Prior Publication Data
US 2018/0022951 A1    Jan. 25, 2018

(30) Foreign Application Priority Data

Jan. 14, 2015 (JP) .................................. 2015-004916

(51) Int. Cl.
*H01B 1/22* (2006.01)
*C09D 5/24* (2006.01)
(Continued)

(52) U.S. Cl.
CPC ............... *C09D 11/52* (2013.01); *C08K 3/08* (2013.01); *C08L 9/02* (2013.01); *C09D 5/24* (2013.01);
(Continued)

(58) Field of Classification Search
CPC ... H01B 1/00; H01B 1/16; H01B 1/22; C09D 5/24; C08K 3/08
See application file for complete search history.

(56) References Cited

U.S. PATENT DOCUMENTS 9,761,349 B2 * 9/2017 Imahashi ................. C09D 5/24
2012/0168683 A1   7/2012 Ko et al.
(Continued)

FOREIGN PATENT DOCUMENTS

JP    2005-276773    10/2005
JP     2006-83249     3/2006
(Continued)

OTHER PUBLICATIONS

International Search Report dated Mar. 29, 2016 in International Application No. PCT/JP2016/050765.
(Continued)

*Primary Examiner* — Mark Kopec
(74) *Attorney, Agent, or Firm* — Wenderoth, Lind & Ponack, L.L.P.

(57) ABSTRACT

The present invention provides an electroconductive paste which is excellent in a stability upon storage for a long period and in an anti-migration property, and capable of forming electrodes, wirings and sheets having a low resistance, an extensibility and a repetitive stretchability.

An electroconductive silver paste, characterized in that, it contains a silver powder (A) and a rubber (B) containing a nitrile group, that a ratio by weight of (A)/(B) is within a range of from 77/23 to 90/10, that the silver powder (A) is an amorphous aggregated powder and/or a flaky powder, and that a content of an alkali metal in the nitrile group-containing rubber (B) is 4,000 ppm or less.

6 Claims, 1 Drawing Sheet

(51) Int. Cl.
  *C09D 11/52* (2014.01)
  *C08K 3/08* (2006.01)
  *C09D 109/02* (2006.01)
  *C08L 9/02* (2006.01)
  *C09D 7/61* (2018.01)
  *C09D 11/037* (2014.01)
  *C09D 11/106* (2014.01)
  *C09D 11/322* (2014.01)
  *C09D 115/00* (2006.01)

(52) U.S. Cl.
  CPC .............. *C09D 7/61* (2018.01); *C09D 11/037* (2013.01); *C09D 11/106* (2013.01); *C09D 11/322* (2013.01); *C09D 109/02* (2013.01); *C09D 115/005* (2013.01); *H01B 1/22* (2013.01); *C08K 2003/0806* (2013.01); *C08K 2201/001* (2013.01)

(56) References Cited

U.S. PATENT DOCUMENTS

2014/0034882 A1    2/2014    Ko et al.
2014/0042374 A1    2/2014    Ko et al.
2014/0238727 A1    8/2014    Roger et al.

FOREIGN PATENT DOCUMENTS

| | | |
|---|---|---|
| JP | 2007-173226 | 7/2007 |
| JP | 2011-216562 | 10/2011 |
| JP | 2012-54192 | 3/2012 |
| JP | 2012-140589 | 7/2012 |
| JP | 2012-236873 | 12/2012 |
| JP | 2014-526117 | 10/2014 |
| WO | 2009/102077 | 8/2009 |

OTHER PUBLICATIONS

Jong-Hyun Ahn and Jung Ho Je, "Stretchable electronics: materials, architectures and integrations", Topical Review, J. Phys. D: Appl. Phys. 45 (2012) 103001 (14 pp).

Kyoung-Yong Chun et al., "Highly conductive, printable and stretchable composite films of carbon nanotubes and silver", Nature Nanotechnology, vol. 5, 853 Dec. 2010.

* cited by examiner

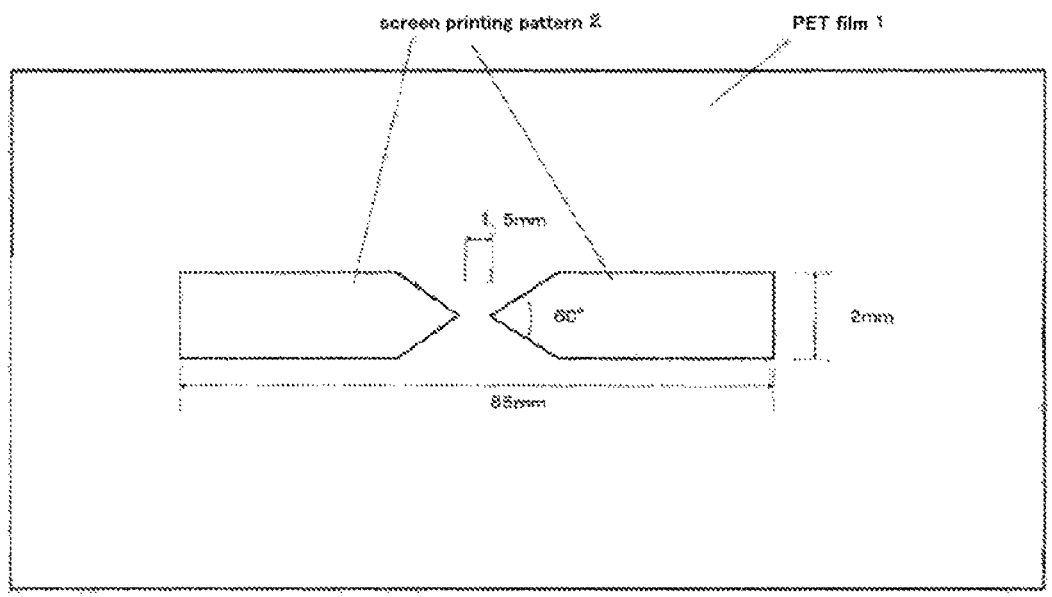

ELECTROCONDUCTIVE SILVER PASTE

TECHNICAL FIELD OF THE INVENTION

The present invention relates to an electroconductive paste which is excellent in a stability upon storage for a long period and in an anti-migration property, and is capable of forming electrodes, wirings and sheets having a low resistance, an extensibility and a repetitive stretchability.

BACKGROUND ART

Basically, most of highly efficient electronics are in a rigid and planar shape and use a single-crystal inorganic material such as silicon and gallium arsenide. On the other hand, when a flexible substrate is used, a flexing resistance is demanded for wirings. Further, in a use such as an electrode for actuator and transducer, and a skin sensor, it is demanded that the electrode and wiring can follow a deformation of a substrate, a dielectric film, etc. made of elastomer, etc. For example, in an actuator, the dielectric film expands and contracts depending upon changes in a voltage applied thereto. Therefore, it is necessary that the electrodes arranged on both sides of the dielectric film can expand and contract depending on the expansion and the contraction of the dielectric film so as not to prevent movements of the dielectric film. Moreover, in addition to the ability of expansion and contraction, it is demanded that changes in an electric resistance are small upon being expanded and contracted.

Further, many electric wires are used for a power supply and for a signal transmission in robots and wearable electronic equipments. In this regard, since the electric wire itself usually has almost no stretchability, it is necessary to arrange the electric wire giving allowance so that movements of robots and humans are not prevented. Such necessity causes a trouble in an actual use. Accordingly, there has been an increasing demand for a stretchable electric wire.

In a field of health care, there has been also a demand for an electroconductive material exhibiting a high stretchability. For example, by using a film made of a stretchable electroconductive material, it is now possible to develop a device which is capable of adapting to a human body being soft, flexible and curvilinear, via a close adhesion thereto. The use of the device as such covers not only a measurement of electrophysiological signal but also a delivery for advanced therapy and an interface between human and machine.

One of methods for solving problems in developing the stretchable electroconductive material is to use an organic electroconductive material. However, although the material which has been used up to now is flexible, it cannot be said to be stretchable. Accordingly, it cannot cover the curvilinear surface. Therefore, it is lacking in a reliability for its property and for its integration into a complex integrated circuit. Although a film made of other materials such as metal nanowire and carbon nanotube are promising to some extent, they are lacking in a reliability and are expensive. Accordingly, a development therefor is difficult.

An elongation rate necessary for the stretchable electroconductive film varies depending upon an actual use. In an expected use such as a stretchable wiring, stretchable antenna and stretchable electrode used in the field of FPC, robot, smart wear, health care sensor, display, solar battery, RFID, game machine, etc., it is desirable that a specific resistance is less than $1 \times 10^{-3}$ $\Omega$cm and also that an expansion is more than about 35%. In an electroconductive film formed by coating or printing of an electroconductive silver paste wherein silver powder is dispersed in resin, it is usual that the electroconductive film is broken or its specific resistance greatly increases upon expansion. The specific resistance upon expansion is desirable to be less than $1 \times 10^{-2}$ $\Omega$cm. When the specific resistance becomes higher, a circuit resistance value becomes high in such a use wherein a fine wiring or long wiring circuit is necessary. Accordingly, such an electroconductive film cannot be used.

Further, when an actual use is considered, it is desired that not only the stretchability is large but also changes in the specific resistance upon being subjected to the repetitive expansion and contraction are small. For example, when a wiring which is closely attached either to the human body directly or to a clothing worn by humans or when a wiring and a sensor which are for curved parts of robot are anticipated, they are repeatedly deformed by every movement in some of the sites and, as a result thereof, the wiring itself is also repeatedly expanded and contracted. Even under such a situation, it is still desirable that the changes in the specific resistance are small. Moreover, in a wiring and an electrode on a substrate material, an adhesion between the substrate material and the electroconductive film becomes small during the stage of being subjected to repetitive expansions and contractions whereby there is a possibility of resulting in a breaking of the wiring or the like. To be more specific, at least 20% of a repetitive stretchability has been demanded in a joint area of a human-type robot and a human body sensor.

In recent years, electric and electronic instruments are becoming lighter, thinner, shorter and smaller and becoming highly functional. As a result thereof, there has been a progress that a width and interval of connecting terminals become into fine pitches and into multiple wirings. Accordingly, an anti-migration property between wirings has been also demanded. Migration is a phenomenon that, when voltage is applied in a presence of moisture, silver powder is ionized, separated out, grown into dendrites and causes a short circuit between electrodes. Even in the case of the stretchable wiring, an excellent anti-migration has been also demanded in view of a reliability.

When distribution and selling are taken into consideration, the electroconductive silver paste is demanded to have a stability upon its storage for a long period. During the process from a production until a consumption, at least three months are demanded in view of a practical use. With regard to conditions for the storage, it is also desired in view of cost burden for a facility, utility, etc. that the paste can be stored in a refrigerator or, further, at room temperature (25° C.) rather than in a freezer.

As to approaches for developing a stretchable flexible wiring, two methods have been mainly reported.

One is a method wherein a corrugated structure is constructed so as to make even fragile materials stretchable (see Non-Patent Document 1). In this method, a metallic thin film is prepared on a silicone rubber by means of vapor deposition, metal plating, photoresist treatment, etc. Although a metallic thin film shows a stretchability of only a few percents, a stretchability can be shown when the metallic thin film is made in a zigzag shape, a continuous horseshoe shape or a corrugated shape, or when the metallic thin film is made in a wrinkled shape or the like by forming the metallic thin film on a previously stretched silicone rubber. However, in any of the above, an electric conductivity lowers to an extent of two digits or more when the metallic thin film is stretched by several tens percents. In addition, since the silicone rubber has a low surface energy, an adhesion between the wiring and the substrate is weak whereby there is a disadvantage that a metallic thin film easily peels off upon stretching. Accordingly, in this method, it is difficult to achieve both a high electrical conductivity and a high stretchability. Moreover, there is another problem that manufacturing costs are high.

Another approach is a composite material consisting of an electrically conductive material and an elastomer. Advantages of this material are an excellent printing property and stretchability. In a commercially available silver paste used for electrodes and wirings, a high amount of silver powder is filled in and compounded with a high elastic modulus binder resin. As a result thereof, a flexibility is poor and a modulus of elasticity is high. Upon stretching, cracks are generated and an electrical conductivity significantly lowers. In view of the above, the investigations have been carried out for a rubber and elastomer as a binder for imparting the flexibility. Also, the investigations have been carried out for a silver flake, a carbon nanotube, a metal nanowire, etc. which have a large aspect ratio as a conductive material and a high electrical conductivity for lowering the filling rate of a conductive material. In a combination of silver particles with a silicone rubber (see Patent Document 1), a decrease in an electric conductivity upon extension is suppressed by such a means that an electroconductive film on the silicone rubber substrate is further coated with a silicone rubber. In a combination of silver particles with a polyurethane emulsion (see Patent Document 2), although a high conductivity and a high elongation rate are reported, methods for dispersing the silver particles are limited because of an aqueous system whereby it is difficult to achieve an electroconductive film wherein silver particles are well dispersed. In addition, there has been no report for a repetitive stretchability. A combination of a carbon nanotube with an ionic liquid and vinylidene fluoride (see Patent Documents 3 and 4) has been also reported but an electric conductivity resulted thereby is too low and uses thereof are restricted. As such, it is a current status that a high electric conductivity and a high stretchability are hardly compatible with each other. On the other hand, there has been a report for a composite material which is printable, highly conductive and can be expanded and contracted by means of a combination of silver particles in a micron size with poly(vinylidene fluoride) and carbon nanotube wherein the surfaces are modified with self-organized silver nanoparticles (see Non-Patent Document 2). In this regard, although a high repetitive stretchability is reported therefor, the composite material is broken when an elongation rate reaches 35%. Also, since a carbon nanotube having a big aspect ratio is compounded, there is a possibility that an anisotropy in a conductivity and a mechanical property is resulted between a print direction and a right-angled direction thereto, when the composite material is made into a film by means of printing or the like. Accordingly, it is not preferred in view of the practical use. In addition, a surface modification of the carbon nanotube by the silver nanoparticles is complicated in its manufacture, resulting in high costs which are not preferred. As mentioned hereinabove, it is a current status that there has been almost no electroconductive silver paste which is capable of forming an electroconductive film such as a wiring, an electrode, an antenna and a sheet having a high elongation rate and a highly repetitive stretchability.

PRIOR ART DOCUMENT

Patent Documents

Patent Document 1: Japanese Patent Application Laid-Open (JP-A) No. 2007-173226

Patent Document 2: Japanese Patent Application Laid-Open (JP-A) No. 2012-54192

Patent Document 3: WO 2009/102077

Patent Document 4: Japanese Patent Application Laid-Open (JP-A) No. 2011-216562

Non-Patent Documents

Non-Patent Document 1: Jong-Hyun Ahn and Jung Ho Je, "Stretchable electronics: materials, architectures and integrations "J. Phys. D: Appl. Phys. 45 (2012) 103001

Non-Patent Document 2: Kyoung-Yong Chun, Youngseok Oh, Jonghyun Rho, Jong-Hyun Ahn, Young-Jin Kim, Hyouk Ryeol Choi and Seunghyun Baik, "Highly conductive, printable and stretchable composite films of carbon nanotubes and silver" Nature Nanotechnology, 5, 853 (2010)

DISCLOSURE OF THE INVENTION

Problem that the Invention is to Solve

The present invention has been achieved in view of the background of the prior art as such and its object is to provide an electroconductive silver paste which is excellent in a stability upon storage for a long period and in an anti-migration property and is capable of forming electrodes, wirings and sheets in a low resistance, an extensibility and a repetitive stretchability.

Means for Solving the Problem

The inventors have eagerly carried out investigations in order to achieve such an object and, as a result, they have found that the above problem can be solved byway of the following means and reached the present invention.

Thus, the present invention consists of the constitution comprising the following (1) to (6).

(1) An electroconductive silver paste, characterized in that, it contains a silver powder (A) and a rubber (B) containing a nitrile group, that a ratio by weight of (A)/(B) is within a range of from 77/23 to 90/10, that the silver powder (A) is an amorphous aggregated powder and/or a flaky powder, and that a content of an alkali metal in the nitrile group-containing rubber (B) is 4,000 ppm or less.

(2) The electroconductive silver paste according to (1), wherein the nitrile group-containing rubber (B) is an acrylonitrile-butadiene rubber and/or a hydrogenated acrylonitrile-butadiene rubber, and a content of the nitrile group therein is 25% by weight or more.

(3) The electroconductive silver paste according to (1) or (2), wherein a content of the alkali metal in the nitrile group-containing rubber (B) is 1,500 ppm or less.

(4) The electroconductive silver paste according to any of (1) to (3), wherein the silver powder (A) is an amorphous aggregated powder.

(5) The electroconductive silver paste according to any of (1) to (4), wherein the paste is capable of forming an electroconductive film having a specific resistance of less than $1.0 \times 10^{-3}$ (Ω·cm).

(6) The electroconductive silver paste according to any of (1) to (5), wherein the paste is capable of forming an electroconductive film having an elongation at break of more than 35% and, when a repetitive stretchability is evaluated with an elongation rate of 20%, the electroconductive film is not broken even if an extension and contraction is repeated for 50 times or more.

Advantages of the Invention

In accordance with the electroconductive silver paste of the present invention, its characteristic feature is that a silver powder (A) which is an anamorphous aggregated powder and/or a flaky powder is dispersed in a nitrile group-containing rubber (B) containing 4,000 ppm or less alkali metal to such an extent that a ratio by weight of (A)/(B) is within a range from 77/23 to 90/10. As a result of a decrease in the content of the alkali metal, a rise in a viscosity with elapse of time is suppressed and a stability upon storage for a long period is improved. Further, as a result of a decrease in the metal ion source, an anti-migration property of the conductive film is also improved. Still further, an electroconductive network is apt to be easily formed in spite of a low filling amount of the silver powder. Accordingly, it is now possible to increase the content of rubber ingredient and thus to achieve a good extensibility and repetitive stretchability.

BRIEF DESCRIPTION OF THE DRAWINGS

FIG. 1 shows a test pattern for evaluating an anti-migration property.

BEST MODE FOR CARRYING OUT THE INVENTION

Hereinafter, an electroconductive silver paste which is an embodiment of the present invention will be illustrated. The electroconductive silver paste of the present invention has features that it contains a silver powder (A) and a rubber (B) containing a nitrile group, that a ratio by weight of (A)/(B) is within a range of from 77/23 to 90/10, that the silver powder (A) is an amorphous aggregated powder and/or a flaky powder, and that a content of an alkali metal in the nitrile group-containing rubber (B) is 4,000 ppm or less. As a result of a decrease in the content of the alkali metal in the nitrile group-containing rubber (B), a rise in a viscosity of the electroconductive silver paste with elapse of time due to pseudo-crosslinking can be suppressed and a stability upon storage for a long period is improved. Further, its anti-migration property upon making into an electroconductive film is also improved due to a decrease in the metal ion source. As a result of preferential adsorption of nitrile group having excellent affinity for the silver powder with a surface of the silver powder, the silver powder in the electroconductive film and the nitrile group-containing rubber do not become a completely uniformly dispersed state. Accordingly, localization and disproportionation like an island-in-sea structure are resulted. Therefore, although a filling amount of the silver powder is low, an electroconductive network is apt to be easily formed. As a result of an increase in the rubber ingredient due to making the filling amount of the silver powder low, a good extensibility and a good repetitive stretchability can be achieved.

Hereinafter, preferred embodiments will be mentioned.

The silver powder (A) is an amorphous aggregated powder and/or a flaky powder and is used for imparting a conductivity to the formed electroconductive film or electroconductive pattern. The silver powder is preferred in view of a conductivity, processing property and reliability. The amorphous aggregated powder is such a thing wherein primary particles in a spherical or amorphous shape are aggregated in a three-dimensional manner. The amorphous aggregated powder and flaky powder have a larger specific surface area than a spherical powder, etc. Therefore, an electroconductive network can be formed thereby even in a low filling amount. Particularly, the amorphous aggregated powder is not in a form of a single dispersion. Therefore, the particles therein physically contact each other whereby an electroconductive network is apt to be easily formed.

Although there is no particular limitation for the particle size of the flaky powder, it is preferred that an average particle size (50% D) of the powder measured by a light scattering method is within 0.5 to 15 μm. It is more preferred to be within 3 to 12 μm. When the average particle size is more than 15 μm, formation of fine wiring is difficult and, in the case of screen printing or like, clogging is resulted. When the average particle size is less than 0.5 μm, there may be cases that contact among the particles is not possible when the filling amount is small and accordingly that a conductivity is deteriorated.

Although there is no particular limitation for the particle size of the amorphous aggregated powder, it is preferred that an average particle size (50% D) of the powder measured by a light scattering method is within 1 to 20 μm. It is more preferred to be within 3 to 12 μm. When the average particle size is more than 20 μm, dispersing property lowers and it is difficult to make into a paste. When the average particle size is less than 1 μm, there may be cases that effects as the aggregated powder are lost and no good conductivity can be maintained when the filling amount is small.

It is preferred that the ratio by weight of the silver powder (A) to the nitrile group-containing rubber (B) is within a range of 77/23 to 90/10. It is more preferred to be 80/20 to 88/12 in view of a compatibility of a specific resistance with an elongation rate and a repetitive stretchability. The ratio by weight is decided by taking a conductivity and a stretchability into consideration. When the ratio by weight of the silver powder (A) is too much, the conductivity becomes good but an amount of the rubber becomes small whereby an extensibility and the repetitive stretchability become bad. When the ratio by weight is too small, the extensibility and the stretchability become good but the electroconductive network is hardly formed whereby the specific resistance becomes bad.

The electroconductive paste of the present invention may be compounded with other conductive powders than the above-mentioned silver powder within such an extent that the content of the present invention is not deteriorated thereby. Examples of the conductive powders are silver powder having a form other than the amorphous aggregated powder and the flaky powder; noble metal powder such as gold powder, platinum powder and palladium powder; base metal powder such as copper powder, nickel powder, aluminum powder and brass powder; plated powder wherein heteroparticles comprising base metal or inorganic substance such as silica are plated with noble metal such as silver; base metal powder which is alloyed with noble metal such as silver; graphite; and carbon powder such as carbon black. Each of those conductive powders may be used solely or jointly. On the other hand, when an electroconductive film is prepared by coating, etc. of a conductive filler having a very high aspect ratio such as carbon nanotube and carbon nanohorn, there is a possibility that an anisotropy in a conductivity and a mechanical property is resulted between a print direction and a right-angled direction thereto whereby it is not preferred in view of a practical use. In addition, because of a bad dispersibility, it is necessary to subject a surface thereof to chemical modification using a functional group. Since the surface modification is complicated in its manufacture becoming a cause of high costs, which may not be preferred.

With regard to the nitrile group-containing rubber (B) wherein the content of alkali metal therein is 4,000 ppm or less, although there is no particular limitation therefor so far as it is a nitrile group-containing rubber or elastomer, the preferred one (s) are/is an acrylonitrile-butadiene rubber (hereinafter, it will be referred to as NBR) and/or hydrogenated acrylonitrile-butadiene rubber (hereinafter, it will be referred to as HNBR). NBR is a copolymer of butadiene with acrylonitrile. HNBR is prepared by hydrogenation of NBR. With regard to the rubber as such, it is preferred to use a rubber polymer or a solution polymer prepared by such a manner that a polymer prepared by emulsion polymerization is aggregated by salting out, filtered, washed and dehydrated. As to a polymerization catalyst in the emulsion polymerization, it is preferred to use a water-soluble initiator such as alkali metal persulfate. A rubber material prepared by suspension polymerization has many branches and its dispersing ability for the silver powder is apt to be low.

The content of the alkali metal according to the present invention is the sum of the content of sodium and the content of potassium, and is a mass-based amount. The content of the alkali metal is preferred to be 4,000 ppm or less, more preferred to be 1,500 ppm or less, and further preferred to be 450 ppm or less. The alkali metal as such is derived from a residue of a polymerization initiator and from an inorganic salt used for the salting out. It is preferred to remove the alkali metal by means of washing or the like as much as possible. When the content of the alkali metal exceeds 4,000 ppm, an anti-migration property of the film lowers. In addition, when the electroconductive silver paste is stored for a long period, its viscosity rises with elapse of time due to pseudo-crosslinking by the alkali metal. As a result, the viscosity does not lower even by stirring and a printing property and a coating property are deteriorated. Although there is no particular limitation for a lower limit of the content of the alkali metal, it is difficult to completely remove it even if filtration and washing are repeatedly carried out. When a productivity is taken into consideration, it is actually about 5 ppm.

Although there is no particular limitation for the content of nitrile group in the nitrile group-containing rubber (B), it is preferred to be 25% by weight or more. It is more preferred to be 35% by weight or more, and further preferred to be 45% by weight or more. Rubber containing no nitrile group exhibits low affinity for the silver powder whereby a breaking stress and an elongation at break become low and no sufficient extensibility and repetitive stretchability are achieved. When the content of the nitrile group is 25% by weight or more, an affinity for the silver powder increases and, as a result of a surface adsorption, a strength of the electroconductive film is enhanced and microcracks upon extension and repetitive expansion and contraction can be suppressed. When the content of the nitrile group is 35% by weight or more, the nitrile group is adsorbed with the silver powder surfaces and, as a result, the silver powder and the rubber in the electroconductive film are localized as in the case of an island-in-sea structure whereupon the electroconductive network is apt to be easily formed in spite of the lower filling amount of the silver powder. When the content of the nitrile group becomes 45% by weight or more, the adsorbing property of the silver powder surfaces is further enhanced whereby a tough electroconductive film can be formed. Accordingly, generation of microcracks upon the extension and upon the repetitive expansion and contraction can be greatly suppressed whereby that is the most preferred. Although there is no particular limitation for an upper limit of the content of the nitrile group, a rubber elasticity decreases when it exceeds 80% by weight whereby the repetitive stretchability may become bad.

The electroconductive silver paste of the present invention may be compounded with other resin within such an extent that it does not deteriorate the content of the invention. Examples thereof are thermoplastic resin, thermosetting resin and rubber other than NBR and HNBR. In order to achieve an extensibility and a repetitive stretchability, rubber is preferred. As to the rubber, there may be exemplified urethane rubber, acrylic rubber, silicone rubber, butadiene rubber, isoprene rubber, sulfurized rubber, styrene-butadiene rubber, butyl rubber, chlorosulfonated polyethylene rubber, ethylene-propylene rubber and vinylidene fluoride copolymer.

An inorganic substance may be added to the electroconductive silver paste of the present invention within such an extent that it does not deteriorate the content of the invention. As to the inorganic substance, there may be used various carbides such as silica powder, silicon carbide, boron carbide, titanium carbide, zirconium carbide, hafnium carbide, vanadium carbide, tantalum carbide, niobium carbide, wolfram carbide, chromium carbide, molybdenum carbide, calcium carbide and diamond carbon lactam; various nitrides such as boron nitride, titanium nitride and zirconium nitride; various borates such as zirconium borate; various oxides such as titanium oxide (titania), calcium oxide, magnesium oxide, zinc oxide, copper oxide, aluminum oxide, silica and colloidal silica; various titanic acid compounds such as calcium titanate, magnesium titanate and strontium titanate; sulfides such as molybdenum disulfide; various fluorides such as magnesium fluoride and carbon fluoride; various metal soaps such as aluminum stearate, calcium stearate, zinc stearate and magnesium stearate; and others such as talc, bentonite, talcum, calcium carbonate, bentonite, kaolin, glass fiber and mica. When the inorganic compound as such is added, there may be the cases wherein a printing property and a heat resistance and, further, a mechanical characteristic and along-term durability can be enhanced.

In addition, there may be also compounded thixotropic agent, antifoaming agent, flame retardant, tackifier, hydrolysis preventer, leveling agent, plasticizer, antioxidant, ultraviolet absorber, flame retardant, pigment and dye therewith.

It is preferred that the electroconductive silver paste of the present invention further contains an organic solvent. The organic solvent used therefor is preferred to be such a one having a boiling point of 100° C. or higher and is lower than 300° C. It is more preferred to be such a one having a boiling point of 150° C. or higher and is lower than 290° C. When the boiling point of the organic solvent is too low, there is such a risk that, during a paste manufacturing step or during a use of the paste, the solvent is evaporated and a ratio of ingredients constituting the electroconductive paste is apt to change. On the other hand, when the boiling point of the organic solvent is too high, there is a possibility that a large amount of the solvent remains in the film when a drying step at a low temperature (such as 150° C. or lower) is demanded whereby there is a risk that a reliability of the electroconductive film decreases.

With regard to the solvent having a high boiling point as such, there may be exemplified cyclohexanone, toluene, isophorone, γ-butyrolactone, benzyl alcohol, Solvesso 100, 150 and 200 manufactured by Exxon Chemical, propylene glycol monomethyl ether acetate, terpineol, butyl glycol acetate, diamylbenzene (boiling point: 260 to 280° C.), triamylbenzene (boiling point: 300 to 320° C.), n-dodecanol (boiling point: 255 to 259° C.), diethylene glycol (boiling point: 245° C.), ethylene glycol monoethyl ether acetate (boiling point: 145° C.), diethylene glycol monoethyl ether acetate (boiling point: 217° C.), diethylene glycol monobutyl ether acetate (boiling point: 247° C.), diethylene glycol dibutyl ether (boiling point: 255° C.), diethylene glycol monoacetate (boiling point: 250° C.), triethylene glycol diacetate (boiling point: 300° C.), triethylene glycol (boiling point: 276° C.), triethylene glycol monomethyl ether (boiling point: 249° C.), triethylene glycol monoethyl ether (boiling point: 256° C.), triethylene glycol monobutyl ether (boiling point: 271° C.), tetraethylene glycol (boiling point: 327° C.), tetraethylene glycol monobutyl ether (boiling point: 304° C.), tripropylene glycol (boiling point: 267° C.), tripropylene glycol monomethyl ether (boiling point: 243° C.) and 2,2,4-trimethyl-1,3-pentanediol monoisobutyrate (boiling point: 253° C.). With regard to a petroleum-type hydrocarbon, there may be exemplified AF Solvent No. 4 (boiling point: 240 to 265° C.), No. 5 (boiling point: 275 to 306° C.), No. 6 (boiling point: 296 to 317° C.), No. 7 (boiling point: 259 to 282° C.), and No. 0 Solvent H (boiling point: 245 to 265° C.) manufactured by Nippon Petrochemicals. Upon necessity, two or more organic solvents thereof may be contained. The organic solvent as such is appropriately added so that the electroconductive silver paste exhibits a viscosity being suitable for printing, etc.

The electroconductive silver paste of the present invention is capable of forming a conductive film when it is coated or printed on a substrate and then an organic solvent is evaporated and dried. Although the range of a film thickness is not particularly limited, it is preferred to be from 1 μm to 1 mm. When it is less than 1 μm, defect of the film such as pinhole is apt to happen and that may results in a problem. When it is more than 1 mm, the solvent is apt to remain in an inner area of the film and a reproducibility of a physical property of the film may be inferior.

Although the substrate to which the electroconductive silver paste is coated is not particularly limited, it is preferred to be a flexible or stretchable substrate. Examples of the flexible substrate are paper, cloth, polyethylene terephthalate, poly(vinyl chloride), polyethylene and polyimide. Examples of the stretchable substrate are polyurethane, polydimethylsiloxane (PDMS), nitrile rubber, butadiene rubber, SBS elastomer and SEBS elastomer. It is preferred that the substrate as such can be put a crease therein and is extendable and shrinkable in a planar direction. With this regard, a substrate consisting of rubber or elastomer is preferred.

When the film of the electroconductive silver paste is released from the substrate to form a wiring, an electrode or a sheet consisting of only the electroconductive film and then transcription or the like is carried out, it is preferred to choose a substrate having an excellent releasing property. To be more specific, there may be exemplified silicone sheet and Teflon (registered trade mark) sheet wherefrom the electroconductive film can be easily released.

Although a step for coating the electroconductive silver paste to the substrate is not particularly limited, it may be conducted, for example, by means of a coating method or a printing method. Examples of the printing method are screen printing method, lithographic offset printing method, ink jet method, flexographic printing method, gravure printing method, gravure offset printing method, stamping method, dispense method and squeegee printing.

A step for heating the substrate which is coated with an electroconductive silver paste may be conducted under an atmospheric air, a vacuum atmosphere, an inert gas atmosphere, a reducing gas atmosphere, etc. The heating temperature is within a range of 20 to 200° C. The heating temperature is selected by taking a demanded electric conductivity, a heat resistance of the substrate, etc. into consideration. The organic solvent is evaporated and, in some cases, a curing reaction proceeds under the heating whereby an electric conductivity, an adhesive property and a surface hardness of the electroconductive film after drying become good. When the heating temperature is lower than 20° C., the solvent may remain in the film whereby the electric conductivity may not be achieved. When the heat treatment is conducted for a long time, the electric conductivity is achieved, but a specific resistance may be significantly inferior. The preferred heating temperature is 70 to 180° C. When it is lower than 70° C., a thermal shrinkage of the film may become small and the electroconductive network of the silver powder in the film may not be sufficiently formed whereby the specific resistance may become higher. Also, an elongation rate and a repetitive stretchability of the electroconductive film may be deteriorated due to a denseness of the film. When it is higher than 180° C., a type of the substrate is limited in view of the heat resistance. Also, when the heat treatment is conducted for a long time, the nitrile group-containing rubber (B) may be thermally degraded whereby the elongation rate and the repetitive stretchability may be deteriorated.

It is preferred that the electroconductive paste of the present invention is capable of forming an electroconductive film having a specific resistance of less than $1.0 \times 10^{-3}$ ($\Omega \cdot cm$). When the specific resistance is $1.0 \times 10^{-3}$ ($\Omega \cdot cm$) or more, restrictions in a film thickness, a wiring length, a wiring width, etc. may be resulted and an adaptation is not possible in a designing of a stretchable wiring, a stretchable antenna and a stretchable electrode which are used in the fields of an FPC, a robot, a smart wear, a health care sensor, a display, a solar battery, an RFID and a game machine. In addition, when a rise in the specific resistance upon an extension and after a repetitive expansion and contraction is taken into consideration, the specific resistance of the electroconductive film is more preferred to be less than $5.0 \times 10^{-4}$ ($\Omega \cdot cm$).

Further, it is preferred that the electroconductive paste of the present invention is capable of forming an electroconductive film having an elongation at break of more than 35% and, when a repetitive stretchability is evaluated with an elongation rate of 20%, the film is not broken even if an extension and contraction is repeated for 50 times or more. When a case of adaptation to joints of a human body and a robot is taken into consideration, the elongation at break of the electroconductive film is more preferred to be 60% or more and, in view of a reliability, it is still more preferred to be 100% or more. Furthermore, it is more preferred that, when a repetitive stretchability is evaluated with an elongation rate of 20%, the electroconductive film is not broken even if an extension and contraction is repeated for 100 times or more. When the reliability for a long period is demanded instead of a disposable use, it is still more preferred that the electroconductive film is not broken even if an extension and contraction is repeated for 1,000 times or more.

EXAMPLES

The present invention will now be specifically illustrated by way of the following Examples although the present invention is not limited thereto. Evaluation results shown in the Examples were measured according to the following methods.

1. Evaluation of Content of Nitrile Group

A composition ratio was obtained by an NMR analysis of a resin material. The obtained composition ratio was converted to a percentage by weight according to a weight ratio of a monomer.

2. Evaluation of Content of Alkali Metal

A resin was subjected to incineration, and a resulting ash was extracted with hydrochloric acid. Contents of sodium and potassium therein were determined by an atomic absorption method and both were totaled.

3. Evaluation of Specific Resistance

A sheet resistance and a film thickness of an electroconductive film in a natural state (elongation rate: 0%) were measured, and the specific resistance was calculated from the measured values. The film thickness and the sheet resistance were measured for four test pieces using a thickness gage SMD-565L (manufactured by Teclock) and a Loresta-GP MCP-T610 (manufactured by Mitsubishi Chemical Analytic), respectively and mean values thereof were used.

After that, the specific resistances when the elongation rates were 40%, 60% and 100% were measured in the same manner as in the case of a natural state (elongation rate: 0%), except that the electroconductive film was expanded by the method of the following 4. As to the specific resistance upon expansion, a value after 30 seconds from a time when a predetermined elongation degree was achieved was read. The specific resistance was calculated from the following formula.

Specific resistance ($\Omega \cdot cm$)=$Rs(\Omega/\Box) \times t$ (cm)

In the formula, "Rs" is a sheet resistance measured under each condition and "t" is a film thickness measured under each condition.

4. Evaluation of Elongation Rate

A coated sample was cut into a size of 20 mm width and 50 mm length to prepare a test piece. The test piece was elongated in a lengthwise direction at an elongation speed of 60 mm/minute, using a universal testing machine (Autograph AG-IS manufactured by Shimadzu). The elongation rate was calculated by the following formula.

Elongation rate (%)=$(\Delta L_0/L_0) \times 100$

In the formula, "$L_0$" is a distance between marked lines of the test piece, and "$\Delta L_0$" is an increase in a distance between the marked lines of the test piece.

5. Evaluation of Repetitive Stretchability

A repetitive durability tester (TIQ-100 manufactured by Rheska) was used. A repetitive expansion and contraction step with an elongation rate of 20% (wherein a coated sample is elongated to an extent of 20% from an original length and then it is returned to the original length) were repeated for 50, 100 and 1,000 times, and then the coated sample was returned to the original length (elongation rate: 0%). Then a specific resistance at that state was measured. Both of a elongation speed and a speed to return to the original length were 60 mm/minute.

6. Evaluation of Anti-Migration Property

An electroconductive silver paste was subjected to screen printing on an annealed polyester film of 100 μm thickness with a pattern of 2.0 mm line width and 85.5 mm length having a gap of 1.5 mm in the center as shown in FIG. 1, and with a dry film thickness of 10 μm. After that, the resulting one was subjected to a thermal treatment at 150° C. for 30 minutes whereupon a sample was prepared. Then, 0.4 ml of distilled water was slowly dropped into the above gap using an injector (1-ml Nipro syringe manufactured by Nipro), 10 V was applied thereto from an electric source of constant voltage (manufactured by Takasago Seisakusho), and an electric current value was measured using a digital multimeter (manufactured by Takeda Riken). A time until the current value reached 0.1 mA was measured and the evaluation was done by a mean value of measurements for five times. When the value was much more, the anti-migration property was much better.

7. Evaluation of Stability Upon Storage for a Long Period

An electroconductive silver paste was subjected to a viscosity measurement using an E-type viscometer at 25° C. and 5 rpm. A viscosity measured after 3 minutes from a start of the measurement was adopted as an initial viscosity. After that, the electroconductive silver paste was stored at 25° C. for 3 months. Then, a viscosity was measured. Immediately before the measurement of the viscosity, the paste was stirred by hand using a glass rod for 30 times. Changing rate of the viscosity was calculated by the following formula.

Changing rate of the viscosity=$(V-V_0)/V_0 \times 100$(%)

In the formula, "V" is the viscosity after storing at 25° C. for 3 months and "$R_0$" is the initial viscosity. The stability upon storage for a long period was judged according to the following criteria.

When the changing rate of viscosity was less than 20%: ○

When the changing rate of viscosity was 20% or more and less than 40%: Δ

When the changing rate of viscosity was 40% or more: ×

8. Evaluation of Iodine Value

Iodine value of HNBR was measured in accordance with JIS K6235.

Preparation Example 1 <Polymerization of NBR (1)>

The followings were charged into a reactor which was made of stainless steel and equipped with a stirrer and a water-cooling jacket.

| | |
|---|---|
| Butadiene | 49 parts by weight |
| Acrylonitrile | 51 parts by weight |
| Deionized water | 270 parts by weight |
| Sodium dodecylbenzenesulfonate | 0.5 part by weight |
| Condensed product of sodium naphthalenesulfonate | 2.5 parts by weight |
| tert-Dodecyl mercaptan | 0.3 part by weight |
| Triethanolamine | 0.2 part by weight |
| Sodium carbonate | 0.1 part by weight |

Then the mixture was gently stirred keeping a bath temperature at 15° C. together with flowing of a nitrogen gas thereinto. After that, an aqueous solution prepared by dissolving 0.3 part by weight of potassium persulfate in 19.7 parts by weight of deionized water was dropped thereinto during 30 minutes, a reaction was continued for further 20 hours. Then, an aqueous solution prepared by dissolving 0.5 part by weight of hydroquinone in 19.5 parts by weight of deionized water was added thereto so as to stop a polymerization.

After that, a pressure in an inner area of the reactor was reduced so as to evaporate an unreacted monomer. Steam was introduced thereinto to recover the unreacted monomer. Then, sodium chloride and diluted sulfuric acid were added to the resulting latex to aggregate and filter. Then, deionized water in an amount of 20 times by volume to the resin was added thereto by dividing into five times so that the resin was dispersed in the deionized water and filtered repetitively to wash. Then, the resin was dried in air to give NBR (1).

Result of the evaluations for the NBR (1) is shown in Table 1.

Preparation Example 2 <Polymerization of NBR (2)>

Preparation Example 1 was repeated except that a washing step was changed. Specifically, deionized water in an amount of 4 times by volume to the resin was used for re-dispersion and filtration only once. Then, the resin was dried in air to give NBR (2). Result of the evaluations is shown in Table 1.

Preparation Example 3 <Polymerization of NBR (3)>

Preparation Example 1 was repeated except that no washing step was done to give NBR (3). Result of the evaluations is shown in Table 1.

Hereinafter, the similar operation was conducted by modifying charging materials, polymerization conditions, washing conditions, etc. to give NBR (4) and NBR (5). Result of the evaluations is shown in Table 1.

Preparation Example 4 <Polymerization of HNBR (1)>

Preparation Example 1 was repeated except that a hydrogenation was done to give HNBR (1). Result of the evaluations is shown in Table 1.

Examples 1 to 9 and Comparative Examples 1 to 5

<Preparation of Electroconductive Silver Paste>

A nitrile group-containing rubber was dissolved in isophorone to give a solution. A silver powder was mixed with this solution to give a mixture. Ingredients in the mixture were compounded with a ratio by weight as mentioned in Tables 2 and 3. Then, kneading was conducted by a three-roll mill to give an electroconductive silver paste.

<Preparation of Electroconductive Film>

The electroconductive silver paste was coated onto a stretchable urethane sheet or Teflon (registered trade mark) sheet in 1 mm thickness by an applicator, and dried at 150° C. for 30 minutes to give a sheet in 100 μm thickness having an electroconductive film. Evaluation of an elongation rate was conducted using the electroconductive film whose Teflon (registered trade mark) sheet was released. A repetitive stretchability was evaluated for the electroconductive film formed on the urethane sheet together with the urethane sheet.

TABLE 1

| | Preparation Example | | | | | |
|---|---|---|---|---|---|---|
| | NBR (1) | NBR (2) | NBR (3) | NBR (4) | NBR (5) | HNBR (1) |
| Content of nitrile group (% by weight) | 51 | 51 | 51 | 36 | 26 | 50 |
| Content of alkali metal (ppm) | 50 | 1400 | 5500 | 48 | 52 | 55 |
| Iodine value (mg/100 mg) | — | — | — | — | — | 25 |

Table 1 shows results of the evaluations for NBR (1) to (5) and HNBR (1) which were prepared as a nitrile group-containing rubber (B).

TABLE 2

| | | | | | Example 1 | Example 2 | Example 3 |
|---|---|---|---|---|---|---|---|
| Silver powder A | | Amorphous aggregated powder | | 1) | 81.5 | 77.4 | 89.4 |
| | | Flaky powder | | 2) | | | |
| | | Spherical powder | | 3) | | | |
| Nitrile group-containing rubber B | NBR | NBR (1) | content of nitrile group 51% by weight content of alkali metal 50 ppm | | 18.5 | 22.6 | 10.6 |
| | | NBR (2) | content of nitrile group 51% by weight content of alkali metal 1400 ppm | | | | |
| | | NBR (3) | content of nitrile group 51% by weight content of alkali metal 5500 ppm | | | | |
| | | NBR (4) | content of nitrile group 36% by weight content of alkali metal 48 ppm | | | | |
| | | NBR (5) | content of nitrile group 26% by weight content of alkali metal 52 ppm | | | | |
| | HNBR | HNBR (1) | content of nitrile group 50% by weight content of alkali metal 55 ppm iodine value 25 mg/100 mg | | | | |
| Other resin | | Copolymerized PES | | 4) | | | |
| (A)/(B) ratio by weight | | | | | 81.5/18.5 | 77.4/22.6 | 89.4/10.6 |
| Evaluation of elongation rate | | | 0% | Specific resistance (×10$^{-4}$ Ω·cm) | 1.5 | 8 | 0.5 |
| | | | 40% | Specific resistance (×10$^{-4}$ Ω·cm) | 3 | 13 | 2 |
| | | | 60% | Specific resistance (×10$^{-4}$ Ω·cm) | 6 | 15 | 5 |
| | | | 100% | Specific resistance (×10$^{-4}$ Ω·cm) | 15 | 90 | 90 |
| Evaluation of 20% repetitive stretchability | | | 50 times | Specific resistance (×10$^{-4}$ Ω·cm) | 2 | 20 | 1 |
| | | | 100 times | Specific resistance (×10$^{-4}$ Ω·cm) | 4 | 30 | 3 |
| | | | 1000 times | Specific resistance (×10$^{-4}$ Ω·cm) | 15 | 340 | 10 |
| Evaluation of anti-migration property | | | | seconds | 200 | 220 | 180 |
| Evaluation of stability upon storage for a long period | | | | 25° C., 3 months | ○ | ○ | ○ |

| | | | | | Example 4 | Example 5 | Example 6 |
|---|---|---|---|---|---|---|---|
| Silver powder A | | Amorphous aggregated powder | | 1) | 81.5 | 81.5 | 81.5 |
| | | Flaky powder | | 2) | | | |
| | | Spherical powder | | 3) | | | |

TABLE 2-continued

| | | | | | | | |
|---|---|---|---|---|---|---|---|
| Nitrile group-containing rubber B | NBR | NBR (1) | content of nitrile group 51% by weight content of alkali metal 50 ppm | | | | |
| | | NBR (2) | content of nitrile group 51% by weight content of alkali metal 1400 ppm | | 18.5 | | |
| | | NBR (3) | content of nitrile group 51% by weight content of alkali metal 5500 ppm | | | | |
| | | NBR (4) | content of nitrile group 36% by weight content of alkali metal 48 ppm | | | 18.5 | |
| | | NBR (5) | content of nitrile group 26% by weight content of alkali metal 52 ppm | | | | 18.5 |
| | HNBR | HNBR (1) | content of nitrile group 50% by weight content of alkali metal 55 ppm iodine value 25 mg/100 mg | | | | |
| Other resin | | | Copolymerized PES | 4) | | | |
| (A)/(B) ratio by weight | | | | | 81.5/18.5 | 81.5/18.5 | 81.5/18.5 |
| Evaluation of elongation rate | | | 0% | Specific resistance (×10⁻⁴ Ω·cm) | 1.6 | 1.4 | 3 |
| | | | 40% | Specific resistance (×10⁻⁴ Ω·cm) | 3 | 4 | 7 |
| | | | 60% | Specific resistance (×10⁻⁴ Ω·cm) | 5 | 10 | 13 |
| | | | 100% | Specific resistance (×10⁻⁴ Ω·cm) | 15 | 20 | 25 |
| Evaluation of 20% repetitive stretchability | | | 50 times | Specific resistance (×10⁻⁴ Ω·cm) | 2.5 | 4 | 8 |
| | | | 100 times | Specific resistance (×10⁻⁴ Ω·cm) | 5 | 8 | 30 |
| | | | 1000 times | Specific resistance (×10⁻⁴ Ω·cm) | 15 | 100 | 350 |
| Evaluation of anti-migration property | | | | seconds | 140 | 205 | 200 |
| Evaluation of stability upon storage for a long period | | | | 25° C., 3 months | Δ | ○ | ○ |

| | | | | | Example 7 | Example 8 | Example 9 |
|---|---|---|---|---|---|---|---|
| Silver powder A | Amorphous aggregated powder | | | 1) | 81.5 | | 69.3 |
| | Flaky powder | | | 2) | | 81.5 | 12.2 |
| | Spherical powder | | | 3) | | | |
| Nitrile group-containing rubber B | NBR | NBR (1) | content of nitrile group 51% by weight content of alkali metal 50 ppm | | | 18.5 | 18.5 |
| | | NBR (2) | content of nitrile group 51% by weight content of alkali metal 1400 ppm | | | | |
| | | NBR (3) | content of nitrile group 51% by weight content of alkali metal 5500 ppm | | | | |
| | | NBR (4) | content of nitrile group 36% by weight content of alkali metal 48 ppm | | | | |
| | | NBR (5) | content of nitrile group 26% by weight content of alkali metal 52 ppm | | | | |
| | HNBR | HNBR (1) | content of nitrile group 50% by weight content of alkali metal 55 ppm iodine value 25 mg/100 mg | | 18.5 | | |
| Other resin | | | Copolymerized PES | 4) | | | |
| (A)/(B) ratio by weight | | | | | 81.5/18.5 | 81.5/18.5 | 81.5/18.5 |
| Evaluation of elongation rate | | | 0% | Specific resistance (×10⁻⁴ Ω·cm) | 1.7 | 2.5 | 1 |
| | | | 40% | Specific resistance (×10⁻⁴ Ω·cm) | 3 | 5 | 3 |
| | | | 60% | Specific resistance (×10⁻⁴ Ω·cm) | 5 | 8 | 4 |
| | | | 100% | Specific resistance (×10⁻⁴ Ω·cm) | 16 | 22 | 19 |
| Evaluation of 20% repetitive stretchability | | | 50 times | Specific resistance (×10⁻⁴ Ω·cm) | 2 | 4 | 2 |
| | | | 100 times | Specific resistance (×10⁻⁴ Ω·cm) | 4 | 8 | 6 |
| | | | 1000 times | Specific resistance (×10⁻⁴ Ω·cm) | 16 | 120 | 26 |
| Evaluation of anti-migration property | | | | seconds | 205 | 250 | 220 |
| Evaluation of stability upon storage for a long period | | | | 25° C., 3 months | ○ | ○ | ○ |

Table 2 shows Examples 1 to 9.

TABLE 3

| | | | | | Comparative Example 1 | Comparative Example 2 | Comparative Example 3 |
|---|---|---|---|---|---|---|---|
| Silver powder A | Amorphous aggregated powder | | | 1) | 72 | 93 | 81.5 |
| | Flaky powder | | | 2) | | | |
| | Spherical powder | | | 3) | | | |
| Nitrile group-containing rubber B | NBR | NBR (1) | content of nitrile group 51% by weight content of alkali metal 50 ppm | | 28 | 7 | |
| | | NBR (2) | content of nitrile group 51% by weight content of alkali metal 1400 ppm | | | | |
| | | NBR (3) | content of nitrile group 51% by weight content of alkali metal 5500 ppm | | | | 18.5 |
| | | NBR (4) | content of nitrile group 36% by weight content of alkali metal 48 ppm | | | | |
| | | NBR (5) | content of nitrile group 26% by weight content of alkali metal 52 ppm | | | | |

TABLE 3-continued

| | | | | | | | |
|---|---|---|---|---|---|---|---|
| | HNBR | HNBR (1) | content of nitrile group 50% by weight content of alkali metal 55 ppm iodine value 25 mg/100 mg | | | | |
| Other resin | | Copolymerized PES | | 4) | | | |
| | | (A)/(B) ratio by weight | | | 72/28 | 93/7 | 81.5/18.5 |
| Evaluation of elongation rate (elongation at break) | | | 0% | Specific resistance (×10⁻⁴ Ω · cm) | 80 | 0.4 | 1.5 |
| | | | 40% | Specific resistance (×10⁻⁴ Ω · cm) | 500 | breakage | 4 |
| | | | 60% | Specific resistance (×10⁻⁴ Ω · cm) | 800 | breakage | 6 |
| | | | 100% | Specific resistance (×10⁻⁴ Ω · cm) | 1500 | breakage | 19 |
| Evaluation of 20% repetitive stretchability | | | 50 times | Specific resistance (×10⁻⁴ Ω · cm) | 150 | breakage | 2 |
| | | | 100 times | Specific resistance (×10⁻⁴ Ω · cm) | 500 | breakage | 6 |
| | | | 1000 times | Specific resistance (×10⁻⁴ Ω · cm) | 35000 | breakage | 20 |
| Evaluation of anti-migration property | | | | seconds | 240 | 170 | 98 |

| | | | | | Comparative Example 4 | Comparative Example 5 |
|---|---|---|---|---|---|---|
| Silver powder A | | Amorphous aggregated powder | | 1) | 83 | |
| | | Flaky powder | | 2) | | |
| | | Spherical powder | | 3) | | 83 |
| Nitrile group-containing rubber B | NBR | NBR (1) | content of nitrile group 51% by weight content of alkali metal 50 ppm | | | 17 |
| | | NBR (2) | content of nitrile group 51% by weight content of alkali metal 1400 ppm | | | |
| | | NBR (3) | content of nitrile group 51% by weight content of alkali metal 5500 ppm | | | |
| | | NBR (4) | content of nitrile group 36% by weight content of alkali metal 48 ppm | | | |
| | | NBR (5) | content of nitrile group 26% by weight content of alkali metal 52 ppm | | | |
| | HNBR | HNBR (1) | content of nitrile group 50% by weight content of alkali metal 55 ppm iodine value 25 mg/100 mg | | | |
| Other resin | | Copolymerized PES | | 4) | 17 | |
| | | (A)/(B) ratio by weight | | | 83/17 | 83/17 |
| Evaluation of elongation rate (elongation at break) | | | 0% | Specific resistance (×10⁻⁴ Ω · cm) | 1000 | 800 |
| | | | 40% | Specific resistance (×10⁻⁴ Ω · cm) | breakage | >100000 |
| | | | 60% | Specific resistance (×10⁻⁴ Ω · cm) | breakage | >100000 |
| | | | 100% | Specific resistance (×10⁻⁴ Ω · cm) | breakage | >100000 |
| Evaluation of 20% repetitive stretchability | | | 50 times | Specific resistance (×10⁻⁴ Ω · cm) | breakage | 1500 |
| | | | 100 times | Specific resistance (×10⁻⁴ Ω · cm) | breakage | 9500 |
| | | | 1000 times | Specific resistance (×10⁻⁴ Ω · cm) | breakage | >100000 |
| Evaluation of anti-migration property | | | | seconds | 205 | 200 |

Table 3 shows Comparative Examples 1 to 5.

Details of 1) to 4) in Tables 2 and 3 are as follows.

1) Silver powder: Amorphous aggregated powder G-35 (average particle size: 5.9 μm; manufactured by Dowa Electronics)

2) Silver powder: Flaky powder FA-D-3 (average particle size: 6.9 μm; manufactured by Dowa Electronics)

3) Silver powder: Spherical powder AG3-8F (average particle size: 1.6 μm; manufactured by Dowa Electronics)

4) Other resin: Copolymerized polyester resin RV 300 (manufactured by Toyobo)

Example 1 in Table 1 is an example wherein an amorphous aggregated powder and an NBR containing 51% by weight of a nitrile group and 50 ppm of an alkali metal were compounded and wherein a ratio by weight of (A)/(B) was 81.5/18.5. The specific resistance when the elongation rate was 0% (initial stage) was 1.5×10⁻⁴ (Ω·cm), that when the elongation rate was 100% was 15×10⁻⁴ (Ω·cm) and that after 20% stretchability upon repetition for 1,000 times was 15×10⁻⁴ (Ω·cm) and they were very good. Similarly, the anti-migration property was 200 seconds and the stability upon storage for a long term (at 25° C. for three months) was very good too.

Example 2 is an example wherein the ratio by weight of (A)/(B) was changed to 77.4/22.6 as compared with Example 1. As a result of a decrease in a filling amount of the silver powder, the specific resistance in the initial stage was a bit high as compared with Example 1 but the characteristics including other ones were good. The anti-migration property was better than that in Example 1 due to the decrease in the filling amount of the silver powder.

Example 3 is an example wherein the ratio by weight of (A)/(B) was changed to 89.4/10.6 as compared with Example 1. As a result of an increase in the filling amount of the silver powder, the specific resistance in the initial stage and the 20% repetitive stretchability were better than those in Example 1. Although the characteristics including other ones were good, the extensibility when the elongation rate was 100% lowers a bit due to an insufficiency of the rubber ingredient. The anti-migration property was a bit lower than that in Example 1 due to the increase in the filling amount of the silver powder.

Example 4 is an example wherein the content of an alkali metal was changed to 1,400 ppm as compared with Example 1. As a result of an increase in the content of the alkali metal, the anti-migration property and the stability upon storage for a long period were a bit inferior as compared with Example 1 but were in a practical level. Similar to Example 1, the specific resistance in the initial stage, the elongation ratio and the 20% repetitive stretchability were very good.

Examples 5 and 6 were the examples wherein the content of the nitrile group was decreased as compared with Example 1. In Example 5 wherein the content of the nitrile group was 36% by weight, the 20% repetitive stretchability was a bit inferior since an interaction between the nitrile group and the silver powder was relatively weak, but any of the characteristics was good. In Example 6, the island-in-sea structure of the film was hardly formed due to a further decrease in the content of the nitrile group, and the specific resistance in the initial stage was relatively a bit high. The extensibility and the 20% repetitive stretchability were also a bit inferior due to the same reason as in Example 5 but any of the characteristics was good.

Example 7 is an example wherein HNBR was used as compared with Example 1. Similar to Example 1, any of characteristics was very good.

Example 8 is an example wherein a flaky powder is used as compared with Example 1. Since its specific surface area is smaller than that of the amorphous aggregated powder, the specific resistance in the initial stage and the 20% repetitive stretchability were relatively a bit inferior. However, the anti-migration property was better than that in Example 1. Any of the characteristics was also sufficiently good.

Example 9 is an example wherein the amorphous aggregated powder and the flaky powder were jointly used as compared with Example 1. Similar to Example 1, any of the characteristics was very good.

Comparative Example 1 is an example wherein the ratio by weight of (A)/(B) was changed to 72/28. The specific resistance when the elongation rate was 0% (initial stage) was $80 \times 10^{-4}$ ($\Omega \cdot cm$) and was inadequate. Evaluations for the elongation rate and the 20% repetitive stretchability were also inferior.

Comparative Example 2 is an example wherein the ratio by weight of (A)/(B) was changed to 93/7. Although the specific resistance when the elongation rate was 0% (initial stage) was $0.4 \times 10^{-4}$ ($\Omega \cdot cm$) and was very good, breakage of the electroconductive film was generated in the evaluation for the elongation rate and the 20% repetitive stretchability and the outcome as such was inadequate.

Comparative Example 3 is an example wherein the content of the alkali metal was changed to 5,500 ppm. Evaluations for the anti-migration property and the stability upon storage for a long period were inadequate.

Comparative Example 4 is an example wherein the nitrile group-containing rubber was changed to a copolymerized polyester resin. The evaluations for the specific resistance when elongation rate was 0% (initial stage), the elongation rate and the 20% repetitive stretchability were inadequate.

Comparative Example 5 is an example wherein the silver powder (A) was changed to a spherical powder. The specific resistance when the elongation rate was 0% (initial stage) was high and the elongation rate was also inadequate.

INDUSTRIAL APPLICABILITY

The electroconductive silver paste in accordance with the present invention is excellent in a stability upon storage for a long period and in an anti-migration property and is capable of forming electrodes, wirings and sheets having a low resistance, an extensibility and a repetitive stretchability. Thus, it can be advantageously utilized in electrodes, wirings, etc. for a flexible display, a stretchable LED array, a stretchable solar battery, a stretchable antenna, a stretchable battery, an actuator, a health care device, a medical sensor, a wearable computer, etc. which use a rubber or elastomer material.

The invention claimed is:

1. An electroconductive silver paste, characterized in that, it contains a silver powder (A) and a rubber (B) containing a nitrile group, that a ratio by weight of (A)/(B) is within a range of from 77/23 to 90/10, that the silver powder (A) is an amorphous aggregated powder and/or a flaky powder, and that a content of an alkali metal in the nitrile group-containing rubber (B) is 4,000 ppm or less.

2. The electroconductive silver paste according to claim 1, wherein the nitrile group-containing rubber (B) is an acrylonitrile-butadiene rubber and/or a hydrogenated acrylonitrile-butadiene rubber, and a content of the nitrile group therein is 25% by weight or more.

3. The electroconductive silver paste according to claim 1, wherein a content of the alkali metal in the nitrile group-containing rubber (B) is 1,500 ppm or less.

4. The electroconductive silver paste according to claim 1, wherein the silver powder (A) is an amorphous aggregated powder.

5. The electroconductive silver paste according to claim 1, wherein the paste is capable of forming an electroconductive film having a specific resistance of less than $1.0 \times 10^{-3}$ ($\Omega \cdot cm$).

6. The electroconductive silver paste according to claim 1, wherein the paste is capable of forming an electroconductive film having an elongation at break of more than 35% and, when a repetitive stretchability is evaluated with an elongation rate of 20%, the electroconductive film is not broken even if an extension and contraction is repeated for 50 times or more.

* * * * *